United States Patent
Weimer et al.

[11] Patent Number: 5,126,121
[45] Date of Patent: Jun. 30, 1992

[54] PROCESS FOR PREPARING ALUMINUM NITRIDE POWDER VIA CONTROLLED COMBUSTION NITRIDATION

[75] Inventors: Alan W. Weimer; John P. Henley; Gene A. Cochran; Glenn A. Eisman; William G. Moore, all of Midland, Mich.

[73] Assignee: The Dow Chemical Company, Midland, Mich.

[21] Appl. No.: 695,376

[22] Filed: May 3, 1991

[51] Int. Cl.$^5$ .............................. C01B 21/072
[52] U.S. Cl. .................................... 423/412
[58] Field of Search .......................... 423/442

[56] References Cited

U.S. PATENT DOCUMENTS

| | | | |
|---|---|---|---|
| 4,610,857 | 9/1986 | Ogawa et al. | 423/335 |
| 4,612,045 | 9/1986 | Shintaku | 75/68 |
| 4,812,166 | 3/1989 | Saiki et al. | 75/0.5 |
| 4,877,759 | 10/1989 | Holt et al. | 423/412 |

FOREIGN PATENT DOCUMENTS

| | | | |
|---|---|---|---|
| 36-21164 | 11/1961 | Japan . | |
| 275472 | 9/1986 | Japan | 21/72 |
| 62-17161 | 1/1987 | Japan | 8/24 |
| 195102 | 8/1988 | Japan | 21/72 |
| 277503 | 11/1988 | Japan | 21/72 |
| 297206 | 12/1988 | Japan | 21/72 |
| 1226709 | 9/1989 | Japan | 21/72 |
| 1308812 | 12/1989 | Japan | 21/72 |
| 1308813 | 12/1989 | Japan | 21/72 |
| 226811 | 1/1990 | Japan | 21/72 |
| 226812 | 1/1990 | Japan | 21/72 |
| 2283604 | 11/1990 | Japan | 21/72 |
| 2283605 | 11/1990 | Japan | 21/72 |

OTHER PUBLICATIONS

N. Hotta et al., *Continuous Synthesis and Properties of Fine AlN Powder by Floating Nitridation Technique*, Nippon Ceramics, 96[7], 731–735 (1988).

*Primary Examiner*—Wayne Langel
*Attorney, Agent, or Firm*—D. R. Howard

[57] ABSTRACT

Rapidly heat powdered aluminum in the presence of a source of nitrogen at a temperature of 1873 to 2373 K. to produce aluminum nitride, then promptly quench the aluminum nitride product. The product has a surface area between 2 and 8 square meters per gram and an oxygen content of less than 1.2 weight percent.

26 Claims, 1 Drawing Sheet

PROCESS FOR PREPARING ALUMINUM NITRIDE POWDER VIA CONTROLLED COMBUSTION NITRIDATION

BACKGROUND OF THE INVENTION

The present invention generally concerns a process for preparing aluminum nitride powder. The present invention more particularly concerns preparing aluminum nitride powder via direct combustion nitridation of aluminum metal.

Aluminum nitride synthesis generally occurs via one of four known processes. One well known process directly reacts aluminum metal with nitrogen ($2Al+N_2 \rightarrow 2AlN$). A second well known process involves carbothermally reducing and nitriding alumina ($Al_2O_3+3C+N_2\rightarrow 2AlN+3CO$). A less common process reacts aluminum chloride and ammonia in a vapor phase ($AlCl_3+4NH_3\rightarrow AlN+3NH_4Cl$). U.S. Pat. No. 3,128,153 discloses an even less common process wherein aluminum phosphide reacts with ammonia ($AlP+NH_3AlN+\frac{1}{4}P_4+3/2H_2$).

Aluminum nitride part properties depend largely upon purity of the aluminum nitride powder from which they are fabricated. Accordingly, any process which inherently leaves impurities in admixture with aluminum nitride powder should be avoided.

The vapor phase reaction of aluminum chloride and ammonia produces ammonium chloride as a byproduct. Kimura et al., in an article entitled "Synthesis of Fine AlN Powder by Vapor Phase Reaction of $AlCl_3$ and $NH_3$", *Yogyo Kyokai Shi,* 96, No. 2, pages 206-210 (1988) teach that ammonium chloride may be removed by high temperature heating. An added complication of the vapor phase synthesis centers upon substantial impurity levels in commercially available aluminum chloride. The aluminum chloride must, therefore, be purified prior to reaction with ammonia.

The reaction of aluminum phosphide with ammonia shares a problem with the vapor phase synthesis. Commercially available aluminum phosphide contains generally unacceptable levels of impurities. In addition, phosphorous is expensive, toxic and highly flammable.

The carbothermal reduction process produces a product which contains residual carbon. The carbon may be oxidized and subsequently removed by a high temperature burnout in air. The burnout also causes some of the aluminum nitride product to oxidize to alumina. The alumina reduces product purity and adversely affects thermal conductivities of articles fabricated from the product.

The direct reaction of aluminum metal to aluminum nitride produces a cleaner product than the other processes for two reasons. First, high purity aluminum is available commercially. Second, the process produces no byproducts.

The direct reaction is exothermic and generates approximately 328 kilojoules per gram-mole of aluminum nitride at 1800 K. Aluminum metal melts at about 933 K. The reaction of aluminum and nitrogen starts at about 1073 K. The reaction, once initiated, is self-propagating if not controlled. An uncontrolled reaction reaches an adiabatic temperature of about 2800 K. Uncontrolled reactions which reach AlN sintering temperatures and remain at these temperatures for extended lengths of time yield sintered aluminum nitride agglomerates. The agglomerates are not readily amenable to further sintering to densities approaching theoretical density via pressureless sintering techniques.

One variation of the direct nitridation process employs plasma reactors to vaporize aluminum metal at temperatures approaching 10,000 K. The vaporized metal then reacts with nitrogen, ammonia, or mixtures of nitrogen and ammonia or nitrogen and hydrogen. The resultant aluminum nitride particles have an average particle size of less than 0.1 micrometer and a surface area of approximately 30 square meters per gram. Baba et al., in "Synthesis and Properties of Ultrafine AlN Powder by RF Plasma", *Applied Physics Letters,* 54 (23), page 2309 (1989), note that "oxygen contents were found to be roughly proportional to the specific surface area when the powder was exposed in air." They also note that "infrared and nuclear magnetic resonance analysis indicated that the surface of the ultrafine powder was covered with aluminum hydroxide and chemisorbed water." The oxygen reacts with aluminum nitride during sintering to form aluminum oxynitride and reduces thermal conductivity of the resultant sintered product.

Bartlett et al. (U.S. Pat. No. 3,141,737) disclose a process wherein aluminum metal reacts with a cyanamide compound and nitrogen at temperatures between 1373 and 1673 K. for a time sufficient to convert the aluminum to aluminum nitride. They suggest that 1473 K. is an optimum temperature for mixtures heated for periods of 30 to 90 minutes.

Y. Shintaku (U.S. Pat. No. 4,612,045) atomizes molten aluminum into a nitriding atmosphere of heated nitrogen gas. The gas must be at a temperature of 1073 K. or higher. The resultant products reportedly contain an amount of unreacted aluminum metal.

Another variation of the direct nitridation process is known as a floating nitridation process. Atomized aluminum powder is incorporated into a stream of gaseous nitrogen and transferred upward through a heated reaction section. The aluminum powder reacts with the gaseous nitrogen in the reaction section. The resultant product is collected overhead. Typical reaction temperatures range between 1623 and 1823 K. N. Hotta et al., in "Synthesis of AlN by the Nitridation of the Floating Al Particles in $N_2$ Gas", *Yogyo Kyokai-Shi,* 95 (2), pages 274-277 (1987), describe a floating nitridation process conducted at temperatures of 1350-1550 degrees Centigrade. They produce very fine aluminum nitride particles having an average size of 0.1 to 0.2 micrometer with reaction times on the order of five seconds. N. Hotta et al., in "Continuous Synthesis and Properties of Fine AlN Powder by Floating Nitridation Technique", *Nippon Ceramics Kyokai Gakaujutsu Ronbun-shu,* 96 (7), pages 731-35 (1988), report an experimentally determined surface area of 8 square meters per gram and an oxygen content of 1.2 weight percent.

N. Hotta et al., in "Synthesis of AlN by the Nitridation of the Floating Al Particles in $N_2$ Gas", *Yogyo Kyokai-Shi,* 95 (2), pages 274-277, report the formation of fibrous aluminum nitride on reactor walls.

H. Yamashita et al. (Japanese Patent Application 01 275472, Sep. 11, 1986) describe a two step floating nitridation process. In step one, aluminum metal in a floating state is reacted with high temperature nitrogen gas for a short period of time at a temperature less than 1473 K. to form a hard aluminum nitride layer only on the surface of the aluminum metal particles. In step two, these intermediate particles are reacted with nitrogen gas at a temperature of 1473 to 2073 K. for a longer period of time. The second step may take place, for example, in a fluidized bed reactor. The resultant aluminum nitride reportedly has an average particle size of one micrometer which equates to a surface area of less than two square meters per gram.

SUMMARY OF THE INVENTION

One aspect of the present invention is a process for preparing aluminum nitride powder which comprises passing particulate aluminum metal and a nitrogen source through a heated reaction zone, said zone being maintained at a temperature sufficient to individually heat substantially all of the aluminum metal particles at a heating rate of at least about 100 K. per second to a temperature within a temperature range of from about 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 2 to about 8 square meters per gram and an oxygen content within a range of greater than about 0 to less than about 1.2 wt %.

In a related aspect, the product passes from the heated reaction zone into a cooling zone which is maintained at a temperature sufficient to individually cool substantially all product particles at a cooling rate of at least about 100 K. per second to a temperature below 1073 K.

A second aspect of the present invention is a process for preparing aluminum nitride powder which comprises passing an admixture of a powdered removable or compatible solid material and particulate aluminum metal and a nitrogen source through a heated reaction zone, the removable or compatible solid material being present in an amount sufficient to reduce deposition of aluminum nitride product upon walls or other surfaces which define the reaction zone, said zone being maintained at a temperature sufficient to individually heat substantially all of the aluminum metal particles at a heating rate of at least about 100 K. per second to a temperature within a temperature range of from 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 0.5 to about 6 square meters per gram and an oxygen content within a range of greater than about 0 to less than about 1 wt %. After the process begins to produce aluminum nitride product, a portion of the product is optionally used as a source of compatible material. The product beneficially has an aluminum nitride content of at least about 90 percent by weight, based upon product weight.

In a related aspect, the product passes from the heated reaction zone into a cooling zone which is maintained at a temperature sufficient to individually cool substantially all product particles at a cooling rate of at least about 100 K. per second to a temperature below 1073 K.

A third aspect of the present invention, related to both the first and second aspects, is a secondary or further reaction step wherein the product is first milled to expose unreacted aluminum metal surfaces and then heated, in the presence of gaseous nitrogen, to a temperature within a range of from about 1173 K. to about 1873 K. for a period of time sufficient to convert substantially all of the exposed, unreacted aluminum metal surfaces to aluminum nitride. Temperatures within a range of from about 1373 K. to about 1873 K. also yield a product surface area which is lower than that of a product prepared without the secondary reaction step. The product surface area reduction may be as much as 10% or even higher.

In a related aspect, the milling and heating occur simultaneously.

A fourth aspect of the present invention is a multi-step process for preparing aluminum nitride powder which comprises:

a) passing an admixture of a previously prepared aluminum nitride powder and particulate aluminum metal and a nitrogen source through a heated reaction zone, the inert solid material being present in an amount sufficient to reduce deposition of aluminum nitride product upon surfaces within the reaction zone, said zone being maintained at a temperature sufficient to individually heat substantially all of the aluminum metal particles at a heating rate of at least about 100 K. per second to a temperature within a temperature range of from 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 0.5 to about 6 square meters per gram and an oxygen content within a range of greater than about 0 to less than about 1 wt %;

b) milling the product for a period of time sufficient to expose substantially all unreacted aluminum metal surfaces;

c) recycling a portion of the milled product for admixture with powdered aluminum metal;

d) heating the milled product, less the recycled portion, in the presence of gaseous nitrogen, to a temperature within a range of from about 1173 K. to about 1873 K. for a period of time sufficient to convert substantially all of the exposed, unreacted aluminum metal surfaces to aluminum nitride. The effect of temperature upon product surface area is the same as that detailed for the third aspect.

BRIEF DESCRIPTION OF THE DRAWING

The FIGURE is a scanning electron photomicrograph of the aluminum nitride product prepared in Example 1.

DETAILED DESCRIPTION OF THE INVENTION

Figure 1:
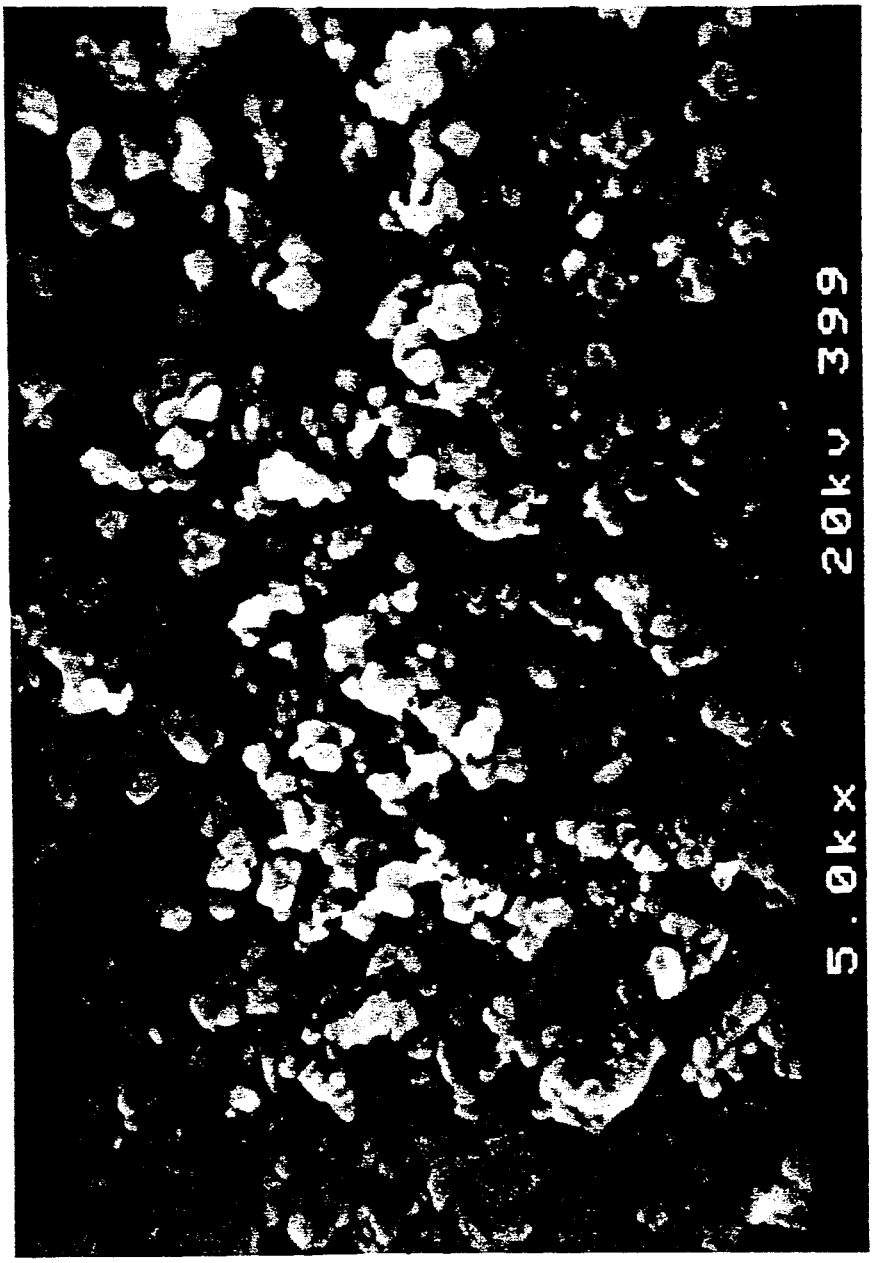

The process of the present invention is suitably carried out in an apparatus like that disclosed in copending application, Ser. No. 07/152,613, filed Feb. 5, 1988. The teachings of the copending application are incorporated herein by reference. The reactor disclosed in the copending application comprises four principal components: a cooled reactant transport member; a reactor chamber; a heating means; and a cooling chamber. A purge gas may be introduced into spaces surrounding the reactor chamber.

The transport member, which may be likened to a conduit disposed within a gas flow space, desirably annular, is suitably maintained at a temperature below that at which powdered aluminum metal melts. The temperature is beneficially sufficient to substantially preclude the powdered aluminum metal from melting and coalescing either within the transport member or proximate to its exit. It is believed that coalescence of the aluminum metal effectively terminates conversion of aluminum to aluminum nitride via the process of the present invention. Gaseous nitrogen diffuses through molten aluminum so slowly that a resultant reaction product would contain a large proportion of unreacted aluminum metal rather than a desirable submicron aluminum nitride powder. In addition, nitridation of molten aluminum surfaces forms an aluminum nitride shell which further limits diffusion of gaseous nitrogen to and through molten aluminum. Accordingly, the temperature is desirably sufficient to allow substantially all of the powdered aluminum metal to enter the reactor chamber as discrete particles. A temperature below the melting point of aluminum (about 933 K.) yields satisfactory results. The range is beneficially from about 275 to about 373 K., desirably from about 275 to about 323 K., and preferably from about 275 to about 298 K.

Powdered aluminum metal or an admixture of powdered aluminum metal and a powdered inert material is suitably fed into the transport section via a powder feeding mechanism. The powder feeding mechanism is not particularly critical so long as it provides a metered or controlled flow of powdered aluminum metal or the powdered admixture to the transport section. As such, the feeding mechanism may be a single screw feeder, a twin screw feeder, a vibratory feeder, a rotary valve feeder or some other conventional feeder.

The powdered aluminum metal should have a purity greater than about 97 percent. The purity is beneficially greater than about 99 percent, desirably greater than about 99.95 percent. Aluminum purities of less than about 97 percent may result in an aluminum nitride product with commercially unacceptable purity and properties.

The aluminum powder has a weighted mean particle size which is beneficially less than about 500 micrometers. The weighted mean particle size desirably falls within a range of from about 5 to about 200 micrometers. The range is preferably from about 5 to about 50 micrometers. The range is even more preferably from about 5 to about 25 micrometers. Weighted mean powder sizes in excess of about 500 micrometers provide less than optimal heat transfer rates. Weighted mean powder sizes below 5 micrometers may result in excessive oxygen in the resultant aluminum nitride powder because of high oxygen contents inherent in such powder sizes.

The removable or compatible solid material is suitably aluminum nitride, carbon or a mixture thereof. Aluminum nitride, when used as a compatible material, beneficially has a purity of greater than about 75%, desirably greater than about 90%, a surface area of from about 1 to about 8 square meters per gram and a particle size within a range of from about 0.1 to about 2 micrometers. The aluminum nitride need not be obtained from any particular source. Desirable results follow, however, when the source is a portion of the aluminum nitride product. The latter portion need not be subjected to a secondary reaction step prior to use as a compatible material. The carbon used as a removable material beneficially has a purity of greater than about 98% carbon, a surface area of from about 10 to about 200 square meters per gram and a particle size within a range of from about 0.01 to about 1.0 micrometers. The removable or compatible solid material is beneficially aluminum nitride rather than carbon as use of the latter generally requires an additional process step to remove excess carbon from resultant products. Carbon reacting with oxygen in the processes may also introduce impurities such as oxycarbides into such products.

The compatible solid material may also be another fine ceramic powder which, when mixed with the AlN product, forms a desirable composite product powder that can be fabricated into dense parts having improved properties over those of AlN alone. Suitable powders may include silicon carbide, boron nitride, boron carbide, titanium diboride, silicon nitride, titanium nitride, titanium carbide, or tantalum nitride. The fine ceramic powder used as a compatible material beneficially has a purity of greater than 98%, a surface area from about 1 to about 30 $m^2/g$ and a particle size within a range of from about 0.05 to about 2 micrometers.

Admixtures of powdered removable or compatible material and powdered aluminum metal suitably contain an amount of removable or compatible material sufficient to noticeably reduce deposition of aluminum nitride product upon reactor wall surfaces or surfaces within the heated reaction zone. It has been found that, in the absence of such powdered removable or compatible material, as much as 60 percent by weight of aluminum nitride product formed by the exothermic reaction in the heated reaction zone tends to migrate toward walls or surfaces which define the reaction zone because these surfaces are cooler than the reacting particles. Although this poses no problems for production runs of moderate length, it can result in problems such as reactor plugging, increased product particle size distribution and variable product surface area for longer production runs. It is believed that the removable or compatible material provides a surface within the reaction zone having a temperature which is cooler than that of the reacting particles site and similar or close to that of reaction zone wall surfaces. It is also believed that because the removable or compatible material is in closer physical proximity to the reacting particles than said particles are to reaction zone wall surfaces, the reacting particles tend to migrate toward the compatible material rather than to said wall surfaces. Incorporation of an appropriate amount of compatible, removable or inert material can reduce wall deposition to as low as 2 to 3 weight percent of the total product or even lower while maintaining sufficient furnace throughput or productivity.

It has been found that molten aluminum will not stick to certain materials such as boron nitride. Therefore, if some aluminum metal reacts at the wall, another means of reducing aluminum nitride deposition on reactor wall surfaces involves either applying a boron nitride coating to said surfaces or fabricating reactor walls from boron nitride.

Admixtures having a compatible, removable or inert material content of from about 20 to about 95 percent by weight of admixture weight yield beneficial results. The admixture inert material content is desirably from about 28 to about 91 percent by weight and preferably from about 33 to about 67 percent by weight.

The admixtures may be prepared by using any one of a number of conventional mixing apparatus. Illustrative apparatus include ribbon blenders, roller mills, vertical screw mixers, V-blenders, and fluidized zone mixers such as that sold under the trade designation FORBERG TM.

The powder feed rate varies with reactor design and capacity. By way of illustration, an acceptable feed rate is from about 0.02 to about 0.5 kilograms per minute for a reactor having a reaction zone volume of 2.16 cubic feet (0.06 cubic meter). Acceptable feed rates for reactors having greater reaction zone volumes may be readily determined without undue experimentation.

Gaseous nitrogen is fed into the transport section in an amount and at a rate of flow sufficient to entrain the powdered aluminum metal prior to entry of the metal into the reactor chamber. Gaseous nitrogen flow rates are related to the aluminum powder flow rates and should be at least stoichiometric, i.e. sufficient to satisfy the equation $2Al + N_2 \rightarrow 2 AlN$. The flow rate is suitably at least one and one-half times stoichiometric. The flow rate is beneficially between one and one-half and four times stoichiometric, desirably between one and one-half and three times stoichiometric. An excessively high flow rate decreases residence time of powdered aluminum within the reaction zone and, in turn, reactor capacity. The flow rate is preferably between one and one-half and two times stoichiometric.

In addition to being supplied at a rate sufficient to satisfy reaction stoichiometry parameters, the flow of gaseous nitrogen is desirably sufficient to effectively entrain and disperse solid reactant materials within the reactor chamber. One means of expressing such a rate of flow is in terms of velocity of the gas as it exits the reactant transport member and enters the reactor chamber. This velocity, hereinafter referred to as "tip speed", varies with volumetric flow of entrainment gas as well as inside diameter of the reactant transport member proximate to its exit. Particularly beneficial results are obtained with a tip speed in excess of about 10 meters/second. Stated differently, such results are obtained when entrained powdered aluminum reactant enters the reaction chamber at a speed in excess of about 10 meters/second. Care must be taken, however, to avoid requiring such a high tip speed that the inside diameter proximate to the exit must be recuced to a point where solids plugging becomes prevalent.

Gaseous nitrogen is also fed into the gas flow space. This gas flows from the gas flow space into the reactor chamber. In doing so, it acts to minimize, if not substantially eliminate, contact of aluminum metal powder with reactor chamber surfaces near their juncture with the transport member exit. Such contact is undesirable because these surfaces tend to be at temperatures which promote coalescence of the aluminum metal. Coalescence leads, in turn, to cessation of operations due to reactor plugging.

The gaseous nitrogen should be as pure as possible. Moisture and residual oxygen impurities adversely affect aluminum nitride product quality. The nitrogen dew point is beneficially less than about 233 K. and desirably less than about 193 K. Oxygen impurity levels are beneficially less than about 5 and desirably less than about 1 part per million parts of gas. If the moisture content is too high, it may be necessary to pass the gaseous nitrogen through a drying bed or dessicant. The gas may also be purified by conventional means to reduce the residual oxygen content.

The nitrogen flow rates also control residence time of the aluminum metal powder within the reaction zone. The residence time is suitably within a range of from about 0.2 second to about 10 seconds, beneficially from about 2 to about 8 seconds, desirably from about 4 to about 6 seconds and preferably about 5 seconds. Residence times of less than about 0.2 seconds tend to yield an incompletely converted product containing unreacted metal. Residence times in excess of 10 seconds produce no great advantage in terms of conversion percentage. In fact, times substantially in excess of 10 seconds may produce undesirable sintered agglomerates rather than powder.

Ammonia may be used instead of, or in addition to, gaseous nitrogen. A mixture of gaseous nitrogen and hydrogen may also be used instead of pure gaseous nitrogen.

The entrained flow of aluminum metal powder or the powdered admixture enters the reaction zone in a form approximating that of a well dispersed dust cloud. The powdered aluminum, whether added alone or in admixture with a removable or compatible material, is heated almost instantly by gas convective and conductive heat transfer and by thermal radiation radiating from reactor walls which define the heated reaction zone. The reaction zone is beneficially maintained at a temperature within a range of from about 1873 to about 2473 K. The temperature range is desirably from about 1873 to about 2373 K. Temperatures below 1873 K. lead to aluminum nitride products with surface areas of 8 square meters per gram or more, particularly where no inert solid material is admixed with powdered aluminum metal. Temperatures of 2473 K. or greater exceed the decomposition temperature of aluminum nitride. Aluminum nitride formed out of a vapor phase upon cooling below 2473 K. tends to be in the form of extremely fine particles of high surface area. The actual temperature within the reaction zone may be determined by optical pyrometry or other suitable means.

The reactor walls may be heated either indirectly by radiation from heating elements spaced around them, inductively via an inductive coil, or directly by electrical resistance. The powdered aluminum is heated at rates within a range of from about 100 to about 10,000,000 K. per second. The range is beneficially from about 1000 to about 10,000,000 K. per second, desirably from about 10,000 to about 1,000,000 K. per second. The rate at which an individual aluminum metal particle is heated varies in response to a number of factors, such as its size, is proximity to the source of heat and density of the dust cloud. The rate should not, however, be so low that substantial coalescence of aluminum particles can occur during a melting phase prior to reaching reaction temperatures.

Aluminum metal begins to react with gaseous nitrogen at about 1073 K. to form aluminum nitride. Within the reaction zone, some of the aluminum may be molten whereas other aluminum may be gaseous. Both forms react rapidly with nitrogen. The reaction is exothermic and, if uncontrolled, would contribute sufficient heat to drive temperatures within the reaction zone toward an adiabatic reaction temperature of approximately 2800 K. If reaction temperatures equal or exceed aluminum nitride sintering temperatures for extended reaction times, resultant reaction products inevitably contain unacceptable levels of aluminum nitride agglomerates.

The reactor walls not only supply heat to the aluminum metal, they serve as a heat sink for heat generated by the reaction. Fine aluminum nitride particles contain only small amounts of sensible heat. In addition, their surface area contributes to ready removal of those small amounts by rapid gas convection and conduction and by thermal radiation to the cooler reactor chamber walls.

The gaseous nitrogen flow which provides an entrained flow of powdered aluminum into the reaction zone also provides an entrained flow of powdered aluminum nitride out of the reaction zone. The entrained flow or dust cloud of aluminum nitride powder beneficially exits the reaction zone and almost immediately enters a cooling zone. The cooling zone quenches or rapidly cools the aluminum nitride powder below its reaction temperature. Cooling rates within the cooling zone beneficially approximate the heating rates within the reaction zone. The cooled walls of the cooling zone and cooled gas tend to rapidly deplete remaining amounts of sensible heat from the aluminum nitride particles. In the absence of rapid cooling, the exothermic reaction could continue for an extended time, thereby resulting in formation of undesirable agglomerates or large grains of aluminum nitride product. Actual cooling times vary depending upon factors such as particle size, cooling zone configuration and gas flow rates. The cooled aluminum nitride particles are suitably collected and processed by conventional technology.

The aluminum nitride product has a surface area which is beneficially from about 0.5 to less than about 8 square meters per gram. The surface area is desirably within a range of from about 2 to about 6 square meters per gram. The product also beneficially has an oxygen content of less than about 1.2 weight percent, based upon product weight. The oxygen content is desirably less than about 1.0 weight percent, preferably less than about 0.8 weight percent. An aluminum nitride product with an excessively high oxygen content will result in final fabricated parts having undesirably low thermal conductivities.

In order to minimize, preferably eliminate, any potential reaction of unreacted aluminum metal powder in the cooling chamber or the downstream collection system or both, an inert gas such as argon is introduced into the cooling chamber. The inert gas can be used as a purge gas, in which case it beneficially mixes with entrainment and sweep gases exiting the reactor chamber and entering the cooling chamber. The inert gas can also be introduced directly into the cooling chamber. If desired, the inert gas may be introduced both as a purge gas and as a direct additive to the cooling chamber. The inert gas effectively quenches the reaction which forms aluminum nitride thereby precluding any further combustion nitridation of unreacted aluminum metal downstream from the reaction zone. As such, it reduces the formation of undesirable agglomerates of aluminum nitride product. It also increases operational safety by eliminating any further exotherm.

The aluminum nitride product is beneficially milled and subjected to a secondary reaction to increase conversion of aluminum to aluminum nitride. The secondary reaction comprises subjecting the aluminum nitride product to an elevated temperature of from about 1123 K. to about 1873 K. in the presence of a source of nitrogen for a period of time within a range of from about 2 minutes to about three hours. The source of nitrogen may be, for example, gaseous nitrogen, a gaseous admixture of nitrogen and hydrogen or ammonia. The temperature is beneficially within a range of from about 1173 K. to about 1673 K., desirably within a range of from about 1223 K. to about 1473 K. and preferably about 1273 K. The period of time is beneficially from about two to about 180 minutes, desirably from about 30 to about 120 minutes and preferably from about 60 to about 90 minutes. If subjected to a secondary reaction at temperatures of 1123 K. to about 1373 K., the aluminum nitride product will undergo substantially no reduction in surface area. Secondary reaction temperatures of greater than 1373 K. to about 1873 K. will effect a surface area reduction. As a general rule minimal surface area reductions occur at low temperatures, e.g., 1373 K., maintained for short periods of time, e.g., about two minutes. Conversely greater surface area reductions follow with higher temperatures, greater lengths of time at temperature or both. End use applications for aluminum nitride powder determine desirable surface area specifications.

Milling, if used, may be accomplished with the aid of any one of a number of conventional milling apparatus. Illustrative apparatus include jet mills and ball mills, the latter containing suitable milling media. Aluminum nitride milling media are preferred. Alumina milling media may be acceptable if milling times are limited. As used herein, the term "limited" means that oxygen impurities (as alumina) introduced by using alumina milling media do not reduce product thermal conductivity below that required for a particular end use application.

The secondary reaction step may be carried out in any one of a number of conventional apparatus. Suitable apparatus include rotary calciners, fluidized beds, vibrating fluidized beds, tube furnaces and pusher furnaces.

Milling and the secondary reaction step can be combined in a single operation if desired. One means of combining operations involves placing rods or grinding media in a rotary calciner during the secondary reaction step. An alternate means consists of heating a rotating ball mill during milling.

The following examples are solely for purposes of illustration and are not to be construed as limiting the scope of the invention. All parts and percentages are by weight unless otherwise stated.

EXAMPLE 1

A six inch (0.152 meter) inside diameter by 11 feet (3.35 meters) long heated zone vertical graphite tube furnace is brought to and maintained at a temperature of 1600 degrees Centigrade (1873 K.) as measured by optical pyrometers.

High purity aluminum metal powder, commercially available from Aluminum Company of America (Alcoa) under the trade designation 7123, is loaded into an overhead feed hopper which is purged with nitrogen gas. The aluminum powder, nominally 99.97% pure, has a surface area of 0.449 square meters per gram, an oxygen content of 0.223 percent by weight, a silicon content of 75 parts per million (ppm), a calcium content of less than 10 ppm, a chromium content of less than 10 ppm, an iron content of of 44 ppm and a mean particle size of 18 micrometers. The nitrogen gas has a dew point of less than −80 degrees Centigrade (193 K.) and an oxygen content of less than one ppm.

The powdered aluminum is conveyed from the hopper to the top of the heated zone tube furnace via a loss-in-weight twin screw feed connected to a reactant transport member like that described in copending application Ser. No. 07/152,613, previously incorporated by reference, at a rate of 0.2 pounds (0.09 kilogram) per minute. The reactant transport member is maintained at a temperature of 283 K. Nitrogen gas flows through the reactant transport member at a rate of three standard cubic feet per minute (SCFM) (85 standard liters per minute, SLM) thus sweeping the aluminum powder with it into the top of the heated zone. An additional one SCFM (28.3 standard liters per minute) of nitrogen gas flows through the gas flow space within which the transport member is disposed and into the top of the furnace. The flow of gas is sufficient to provide the powder with an average residence time in the heated zone of about 5.4 seconds accounting for the decrease in nitrogen flow due to reaction and the conversion to AlN. The characteristic heating time for the feed aluminum particles equate to an estimated heating rate of approximately $10^5$ K./second.

The submicron product powder is swept through the cooling zone by approximately 3 SCFM (85 SLM) of unreacted $N_2$ exiting the reaction zone. The calculated residence time in the cooling zone was approximately 3.2 minutes.

Product powder from the reactor is collected downstream from a cooling zone and analyzed. The cooling zone has an inside diameter of 18 inches (45.7 cm), a length of six feet (1.8 meters) and a volume of 10.6 cubic feet (0.3 cubic meters). Coolant maintained at a temperature of 283 K. and flowing through a jacket surrounding the cooling zone cools the product powder and gas to a measured temperature of approximately 303 K. The rate of cooling approximates the rate of heating. An x-ray diffraction pattern of the product indicates that the powder is substantially aluminum nitride, but contains some unreacted metal. The oxygen and nitrogen contents, as determined by a LECO analyzer are, respectively, 0.6 weight percent and 31.6 weight percent. The nitrogen content equates to an aluminum nitride content of about 93 weight percent. A scanning electron photomicrograph (SEM) of the product (see FIGURE) indicates that the powder is largely present as uniform crystals having a diameter of from about 0.4 to about 0.8 micrometer. The powder has an unmilled aggregate surface area of about 2.6 square meters per gram as determined by Brunauer-Emmett-Teller (BET) analysis, a nitrogen physisorption analysis.

The product powder is dry ball milled for two hours using AlN media to break up light agglomerates of product. The term "light agglomerates" describes agglomerates which break apart readily when rubbed between thumb and fingers with minimal pressure. The BET surface area after ball milling is 4.0 square meters per gram. Taking into account about 7 weight percent of unreacted aluminum with an estimated surface area of 0.449 square meters per gram, the aluminum nitride has a calculated weighted average surface area of about 4.2 square meters per gram.

A sample of the ball milled product is placed in a quartz tube furnace and heated to 930 degrees Centigrade (1203 K.) for one hour in the presence of flowing nitrogen gas. The dew point and oxygen content of the nitrogen are the same as that used in the reactor. After it is cooled, the heated powder has an oxygen content of 0.76 weight percent and a nitrogen content of 34.2 weight percent, an indication of complete conversion to aluminum nitride. The cooled powder has a surface area of 4.6 square meters per gram. Metal impurities in the cooled powder, as determined by x-ray fluorescence, are 5 ppm calcium, 20 ppm silicon, 14 ppm chromium and 33 ppm iron. The increased chromium content is believed to come from the milling media.

This example supports several observations. First, controlling the temperature at 1873 K. provides a product free of large sintered agglomerates. By way of comparison, such agglomerates and large grains are typical in commercially available AlN powders manufactured by direct nitridation process. Second, the product has a desirable oxygen content of less than one weight percent. Low oxygen contents are believed to yield high thermal conductivities in resultant formed parts. Third, a simple post-reaction milling and heat treatment completes conversion of unreacted metal and provides a very pure aluminum nitride product having a desirable surface area.

EXAMPLE 2

Portions of the cooled aluminum nitride powder prepared in Example 1 are blended with amounts of yttria powder and organic binder sufficient to provide admixtures having an yttria content of three percent by weight, based upon admixture weight. The admixtures are cold pressed at 15,000 psi ($1.03 \times 10^8$ Pa) into 2 mm preforms suitable for sintering. The binder is removed from the preforms in either a flowing air or $N_2$ environment at 823 K. for 1 hour. Each preform is subjected to sintering conditions as shown in Table I below. The thickness, density and thermal conductivity of each of the resultant sintered parts are also shown in Table I.

TABLE I

| | SINTERING CONDITIONS | | | SINTERED PART PROPERTIES | | |
|---|---|---|---|---|---|---|
| Sample | Temperature (K) | Time* (Hours) | Binder Removal** | Thickness (mm) | Density (% Theoretical) | Thermal Conductivity (W/m-K) |
| 2A+ | 2103 | 3 | A | 1.89 | 97.54 | 181 |
| 2B+ | 2103 | 3 | N | 1.92 | 96.77 | 193 |
| 2C | 2133 | 1 | A | 1.89 | 99.8 | 161 |
| 2D | 2133 | 1 | N | 1.88 | 96.89 | 151 |
| 2E | 2173 | 1 | N | 1.84 | 99.49 | 188 |
| 2F+ | 2103 | 16.67 | N | 1.88 | 100.00 | 224 |

*Time at sintering temperature
**A = Air; N = Nitrogen
+Cooled to 1773 K at a rate of 1 K/minute after sintering The data presented in Table I demonstrate the suitability of aluminum nitride powder prepared in accordance with the present invention for use in electronics applications requiring thermal conductivities in excess of 150 watts/meter-K (W/m-K). Similar results are expected with other aluminum nitride powders prepared in accordance with the present invention.

EXAMPLES 3-8

The process of Example 1 is replicated save for changing the temperature at which the heated zone of the vertical reactor is maintained. Table II shows the temperature for each example and respective analytical results and surface area measurements for each product powder. Table II includes corresponding results from Example 1.

TABLE II
EFFECT OF TEMPERATURE ON PRODUCT SURFACE AREA

| Example No. | Temperature - Kelvin | Time (Seconds) | Oxygen Content (Weight %) | Nitrogen Content (Weight %) | Aluminum Nitride Content (Weight %) | Aluminum Nitride Surface Area ($m^2/g$) |
|---|---|---|---|---|---|---|
| 1 | 1873 | 5.4 | 0.60 | 31.6 | 93 | 4.2 |
| 3 | 1973 | 5.0 | 0.49 | 29.3 | 86 | 3.7 |
| 4 | 2073 | 5.3 | 0.45 | 29.5 | 86 | 2.0 |
| 5 | 2173 | 4.6 | 0.28 | 29.9 | 91 | 2.2 |
| 6 | 2273 | 5.2 | 0.23 | 30.8 | 90 | 2.5 |
| 7 | 2373 | 4.3 | 0.14 | 25.5 | 75 | 5.5 |
| 8 | 2473 | 4.3 | 0.16 | 27.1 | 79 | 19.7 |

The data in the table demonstrate that, up to about 2073 K., aluminum nitride surface area decreases with increasing temperature due to particle growth. As temperatures continue to increase, surface area increases due to formation of an increasing percentage of small particles of aluminum nitride from the reaction of gaseous aluminum with $N_2$. The data also demonstrate that surface area can be controlled within a range of 2 to 6 square meters per gram by controlling temperature between 1873 and 2373 K. The data further demonstrate that the process of the present invention yields consistently low oxygen contents.

EXAMPLE 9

The process of Example 1 is duplicated with a 5.9 kilogram quantity of the aluminum powder. Eight pounds (3.6 kilograms) of product powder is collected downstream from the cooling zone. It has a 22.8% atomic nitrogen content as determined with a LECO analyzer. The nitrogen content indicates a lower conversion of aluminum to aluminum nitride than in Example 1.

The reaction chamber is cooled to ambient temperature and the top of the reactor is dismantled. Visual inspection of the reaction chamber shows that a substantial amount of powder has migrated to the wall of the reaction chamber thereby reducing effective volume of the chamber, decreasing residence time and masking heat transfer from the outside wall. A total of 4.7 kilograms of powder is scraped from the chamber wall and analyzed (LECO analyzer) as being substantially aluminum nitride.

The foregoing procedure is replicated until a total of 52.1 kilograms of aluminum powder passes through the heated reaction zone. A cumulative total of 40.7 kilograms of powder analyzed as being substantially pure aluminum nitride is scraped from the wall. A cumulative total of 34.9 kilograms of powder is collected as a downstream product. Analysis of the downstream product with a LECO analyzer indicates the presence of some unreacted aluminum metal. The downstream product has a calculated aluminum nitride content of 26.4 kilograms. In other words, a significant portion of both the powder and the resultant aluminum nitride is contained in scrapings from reactor wall surfaces.

A scanning electron micrograph (SEM) of powder scraped from the reactor wall reveals the presence of a large quantity of high aspect ratio whiskers, e.g., 80 micrometers in length versus a diameter of 3 micrometers.

This example demonstrates that hot reacting particles migrate to colder surfaces in substantial amounts. In other words, although satisfactory aluminum nitride product is obtained, continuous operations is not attainable as the reactor must be shut down periodically for cleaning.

EXAMPLE 10

The procedure of Example 9 is duplicated save for substituting 30.2 kilograms of a 50/50 weight mixture of powdered aluminum metal and aluminum nitride powder for the powdered aluminum metal raw material of Example 8. The aluminum metal is the same in each example. The aluminum nitride powder has a surface area of 2.8 square meters per gram. The mixture is prepared by blending for eight hours in a roller mill.

A total of 36.3 kilograms of powder having an atomic nitrogen content of 30.8 weight percent is collected as a downstream product. This equates to an aluminum nitride content of 32.7 kilograms. After dismantling the top of the reaction chamber as in Example 9, a visual inspection shows no significant accumulation of material on reactor wall surfaces. A total of one kilogram of powder is scraped from the wall of the chamber and analyzed as being substantially pure aluminum nitride. The term "substantially pure aluminum nitride" means that the powder has an atomic nitrogen content which approximates a 34.15% theoretical nitrogen content assigned to pure aluminum nitride.

The powder scraped from the wall amounts to 2.7 percent of recovered powder ((1/37.3)×100). This equates to an aluminum nitride percentage of 3.0 percent ((1/33.7)×100). An SEM of powder collected as a downstream product contains no discernible needle-like material.

This Example shows that wall deposition diminishes markedly when an inert material is admixed with aluminum metal prior to nitridation. Similar results are obtained with other materials prepared in accordance with the present invention.

EXAMPLE 11

The procedure of Example 9 is duplicated save for substituting 1.65 kilograms of a mixture of 66 percent powdered aluminum metal, 29 percent aluminum nitride powder and 5 percent acetylene carbon black for the powdered aluminum metal raw material of Example 8. The aluminum nitride powder has a surface area of 2.5 square meters per gram. The mixture is prepared as in Example 9. Powder scraped from reactor walls amounts to 3.4 percent of total recovered powder.

EXAMPLE 12

The procedure of Example 9 is duplicated save for substituting 7.73 kilograms of a mixture of 9 percent powdered aluminum metal and 91 percent aluminum nitride powder for the powdered aluminum metal raw material of Example 9. The aluminum nitride powder is the same as that used in Example 11. The mixture is prepared as in Example 10. Powder scraped from reactor walls amounts to 0.8 percent of total recovered powder.

Data presented in Examples 9-12 amply demonstrate that including an amount of inert powdered material in admixture with aluminum metal powder markedly reduces reactor wall build-up. This translates to extended reactor run times. Similar results are expected with other mixtures and operating conditions, all of which are disclosed herein.

EXAMPLE 13

The procedure of Example 9 is duplicated save for substituting 9.78 kilograms of a mixture of 66 percent powdered aluminum metal and 34 percent aluminum nitride powder for the powdered aluminum metal raw material of Example 9. The aluminum nitride powder has a surface area of 2.6 square meters per gram. The mixture has a 0.04 percent carbon content, a 0.5 percent oxygen content and an 11.6 percent nitrogen content.

Raw aluminum nitride product collected from the cooling zone is evaluated for carbon, oxygen and nitrogen content via LECO analyzers and BET surface area. The contents are as follows: 0.05% carbon; 0.51% oxygen; and 34.2% nitrogen. The BET surface area is 1.7 square meters per gram. The raw product contains a small amount of residual free aluminum metal as determined by reaction of a sample of the raw product with hydrochloric acid.

After post treatment as in Example 1, the product has a carbon content of 0.06 percent; an oxygen content of 0.70 percent; and a nitrogen content of 33.6 percent. The post-treated product has a surface area of 2.0 square meters per gram. X-ray diffraction reveals no residual free aluminum metal.

EXAMPLE 14

The procedure of Example 9 is duplicated save for substituting 13.37 kilograms of a mixture of 72 percent powdered aluminum metal and 28 percent aluminum nitride powder for the powdered aluminum metal raw material of Example 9. The aluminum nitride powder has a surface area of 3.5 square meters per gram. The mixture has a 0.02 percent carbon content, a 0.6 percent oxygen content and a 9.6 percent nitrogen content.

Raw aluminum nitride product, collected as in Example 13, has a residual carbon content of 0.05 percent, an oxygen content of 0.74 percent and a nitrogen content of 33.6 percent. The raw product also has a BET surface area of 2.6 square meters per gram. As in Example 13, the raw product contains a small amount of residual free aluminum metal.

After post treatment as in Example 13, the product has a carbon content of 0.08 percent; an oxygen content of 1.0 percent; and a nitrogen content of 33.4 percent. The post-treated product has a surface area of 3.0 square meters per gram. As in Example 13, X-ray diffraction reveals no residual free aluminum metal.

Examples 13 and 14, when compared to Example 1, demonstrate that use of inert materials leads to increased conversion of aluminum metal to aluminum nitride and lower aluminum nitride product surface area. Similar results are expected with other mixtures and operating conditions, all of which are disclosed herein.

EXAMPLE 15

A continuous ribbon blender maintained under a nitrogen pad is used to blend about 27.4 pounds per hour (lb/hr)($3.46 \times 10^{-3}$ kg/sec) of the same aluminum metal powder as used in Example 1 with 14.7 lb/hr ($1.85 \times 10^{-3}$ kg/sec) of a milled recycle stream of 93.6% by weight, based upon stream weight, of aluminum nitride.

The blend is fed into the same apparatus as in Example 1 at a rate of 41.4 lb/hr ($5.2 \times 10^{-3}$ kg/sec) together with an entraining flow of nitrogen gas at a rate of 28.5 lb/hr ($3.59 \times 10^{-3}$ kg/sec). The blend is reacted in the same manner as the aluminum powder of Example 1 with a residence time in the heated reaction zone of about 5 seconds. About 55.1 lb/hr ($6.95 \times 10^{-3}$ kg/sec) of raw product containing about 93.6% aluminum nitride, 4.8% free aluminum and 1.6% alumina exits the cooling zone. The raw product is milled via an in-line jet mill to expose unreacted aluminum metal. About 14.7 lb/hr ($1.85 \times 10^{-3}$ kg/sec) of the milled product is recycled for blending with powdered aluminum metal. The remaining 40.4 lb/hr ($5.09 \times 10^{-3}$ kg/sec) of milled product is fed continuously along with a nitrogen gas stream flowing at approximately 10 SCFM (280 standard liters per minute) to a rotary calciner operating at a temperature of 1000 degrees Centigrade (1273 K.) and providing a residence time of about one hour. The calcined product exits the rotary calciner at a rate of 40.8 lb/hr ($5.15 \times 10^{-3}$ kg/sec). The calcined product is substantially aluminum nitride with the following impurities: less than 0.1% carbon; less than 1.0% oxygen, less than 35 ppm iron; less than 100 ppm silicon; and less than 20 ppm calcium. The product has a surface area of less than 6 m$^2$/g.

Example 15 demonstrates the suitability of using a portion of the aluminum nitride product prepared in accordance with the present invention as a source of inert material.

EXAMPLES 16-17 AND COMPARATIVE EXAMPLES A-B

The procedure of Example 1 is replicated save for reducing the average residence time in the heated reaction zone and varying the reactant transport member's inside diameter. The inside diameter and tip speed are shown in Table III below together with product nitrogen and aluminum nitride contents.

TABLE III

| Example/ Comparative Example | I.D. (m × 10$^2$) | Tip Speed (m/sec) | Product % N | % AlN |
|---|---|---|---|---|
| Example 16 | 1.38 | 10.30 | 30.9 | 90.4 |
| Example 17 | 1.01 | 16.50 | 30.5 | 89.3 |
| Comparative Example A | 2.53 | 3.10 | 16.6 | 49.0 |
| Comparative Example B | 1.69 | 6.89 | 21.0 | 62.0 |

The data summarized in Table III amply demonstrate that, given a constant solids feed rate, tip speed has a marked effect upon the dispersion of feed aluminum powder and hence, conversion of aluminum to aluminum nitride. A tip speed in excess of about 10 meters per second provides satisfactory conversion rates. Similar results are obtained with other compositions and process variations, all of which are disclosed herein.

EXAMPLES 18-22

The procedure of Example 10 is replicated save for varying the proportion of aluminum metal in the mixture, the solids feed rate and the rate of flow of entraining nitrogen gas. The reactant transport member has a nominal inside diameter of 0.5 inch ($1.38 \times 10^{-2}$ meters). The flow of nitrogen gas is adjusted to maintain a tip speed in excess of 10 meters/second. The solids feed rates, aluminum metal contents and the tip speeds are shown in Table IV below together with product nitrogen and aluminum nitride contents.

TABLE IV

| Example | Solids Feed Rate (kg/min) | Feed % Al Metal | Tip speed (m/sec) | Product % N | % AlN |
|---|---|---|---|---|---|
| 18 | 0.09 | 43 | 10.3 | 32.1 | 94.0 |
| 19 | 0.18 | 43 | 10.3 | 33.0 | 96.5 |
| 20 | 0.27 | 43 | 10.3 | 32.9 | 96.3 |
| 21 | 0.36 | 44 | 13.7 | 34.2 | 100 |
| 22 | 0.43 | 51 | 13.7 | 34.2 | 100 |

The data presented in Table IV show that solids feed rates have minimal effect upon conversion rates at tip speeds in excess of 10 meters/second. Similar results are expected with other compositions and process variations, all of which are disclosed herein.

EXAMPLE 23

A 5 inch (12.7 cm) inside diameter×6″ (15.2 cm) deep graphite crucible is configured and equipped within an inductively heated furnace so that the crucible can be rotated and inclined during heating. The crucible is modified so as it is lined with aluminum nitride plates, effectively making the inside liner substantially aluminum nitride. The aluminum nitride lined crucible is loaded with 1.6 kg of ⅜″ (0.95 cm) diameter aluminum nitride spherical grinding media and inclined at an angle of 20 degrees from the horizontal (ground). The void space between the aluminum nitride media is filled with approximately 200 g of a raw aluminum nitride powder synthesized as described in Example 14. Nitrogen gas flows into and out of the crucible at the rate of approximately 0.5 SCFM (14 standard liters per minute). The lined and filled crucible is rotated at 15 RPM and inductively heated at a rate of approximately 15 K./minute until a temperature of 1373 K. is reached. The temperature is maintained at 1373 K. for approximately 2 hours. The rotating crucible is effectively a device in which secondary milling and secondary heating steps are combined and carried out simultaneously. After the two hour heating/milling treatment, the crucible is cooled. The post treated powder is analyzed for aluminum nitride content and surface area. Analysis with a LECO analyzer shows a monatomic oxygen content of 0.78 wt % and a monatomic nitrogen content of 34.2 wt % thus indicating a high degree of aluminum nitride purity. An x-ray diffraction pattern of the finished powder shows that no free aluminum remains. The post-treated powder has a BET surface area of 3.0 m²/g.

This example demonstrates that the secondary milling step and heating step may be combined and carried out simultaneously to effectively convert raw aluminum nitride powder to high purity aluminum nitride having a desirable surface area. This powder is believed to be suitable for part fabrication by pressureless sintering techniques.

EXAMPLE 24

The process of Example 1 is replicated save for introducing approximately 3.5 SCFM (99.2 SLM) of argon at ambient temperature directly into the cooling zone inlet along with entering AlN and 3 SCFM residual process $N_2$ from the reaction zone The temperature of cooled powder and gas exiting the cooling zone is measured to be approximately 301 K. The resistance time of product AlN powder swept through the cooling zone by process $N_2$ and argon gas is approximately 90 seconds.

This example demonstrates that argon gas can be introduced directly into the cooling zone to quench the reaction and cool the AlN product.

What is claimed is:

1. A process for preparing aluminum nitride powder which comprises passing particulate aluminum metal and a nitrogen source through a heated reaction zone, said zone being maintained at a temperature sufficient to individually heat substantially all of the aluminum metal particles at a heating rate of at least about 100 K. per second to a temperature within a temperature range of from about 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 2 to about 8 square meters per gram and an oxygen content within a range of greater than 0 to less than about 1.2 percent by weight, based upon aluminum nitride weight, of monatomic oxygen.

2. The process of claim 1 wherein the particulate aluminum metal enters the heated reaction zone at a velocity of at least 10 meters per second.

3. The process of claim 1 further comprising a sequential step wherein the particulate product is passed into a cooling zone after it exits the heated reaction zone and quenched to a temperature below that at which particulate aluminum metal is converted to aluminum nitride.

4. The process of claim 3 wherein the product is quenched within a time of from about 0.1 second to about 4 minutes after said product exits the heated reaction zone.

5. The process of claim 3 wherein the time is from about 0.1 second to about 2 minutes.

6. The process of claim 3 wherein argon gas is fed into the cooling zone to quench the reaction.

7. The process of claim 3 wherein the cooling rate is at least 100 K. per second.

8. The process of claim 3 wherein the cooling rate is from about 100 K. to about 10,000,000 K. per second.

9. The process of claim 3 wherein the cooling rate is from about 1,000 K. to about 10,000,000 K. per second.

10. The process of claim 3 wherein the cooling rate is from about 10,000 K. to about 1,000,000 K. per second.

11. The process of claim 1 wherein the aluminum metal particles are maintained within the temperature range for a period of from about 2 to about 8 seconds.

12. The process of claim 11 wherein the time period is from about 4 to about 6 seconds.

13. The process of claim 1 wherein the heating rate is from about 100 K. to about 10,000,000 K. per second.

14. The process of claim 13 wherein the heating rate is from about 1,000 K. to about 10,000,000 K. per second.

15. The process of claim 13 wherein the heating rate is from about 10,000 K. to about 1,000,000 K. per second.

16. The process of claim 1 further comprising a sequential step wherein the product is milled to expose unreacted aluminum metal and then heated, in the presence of gaseous nitrogen, to a temperature of from about 1173 K. to about 1873 K. for a period of time sufficient to convert substantially all of the exposed, unreacted aluminum metal surfaces to aluminum nitride.

17. The process of claim 16 wherein the milling step and secondary heating step are combined and carried out simultaneously.

18. A process for preparing aluminum nitride powder which comprises passing an admixture of a powdered compatible or removable solid material and particulate aluminum metal and a nitrogen source through a heated reaction zone, the compatible or removable solid material being present in an amount sufficient to reduce deposition of aluminum nitride product upon surfaces which define the reaction zone, said zone being maintained at a temperature sufficient to individually heat substantially all of the aluminum metal particles at a heating rate of at least about 100 K. per second to a temperature within a temperature range of from about 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 0.5 to about 6 square meters per gram and an oxygen content within a range of greater than 0 to less than about 1 percent by weight.

19. The process of claim 18 wherein the compatible material is aluminum nitride.

20. The process of claim 18 wherein the removable material is carbon.

21. The process of claim 18 wherein the compatible material is silicon carbide, boron nitride, boron carbide, titanium diboride, silicon nitride, titanium nitride, titanium carbide, or tantalum nitride.

22. The process of claim 18 further comprising a sequential step wherein the product is milled to expose unreacted aluminum metal and then heated, in the presence of gaseous nitrogen, to a temperature of from about 1173 K. to about 1873 K. for a period of time sufficient to reduce product surface area by at least 10%.

23. The process of claim 18 further comprising a sequential step wherein its product is simultaneously milled to expose unreacted aluminum metal and heated, in the presence of gaseous nitrogen, to a temperature of from about 1173 K. to about 1873 K. for a period of time sufficient to reduce product surface area by at least 10%.

24. A multi-step process for preparing aluminum nitride powder which comprises:
a) passing an admixture of a previously prepared aluminum nitride power and particulate aluminum metal and a nitrogen source through a heated reaction zone, the previously prepared aluminum nitride powder solid material being present in an amount sufficient to reduce deposition of aluminum nitride product upon surfaces within the reaction zone, said zone being maintained at a temperature sufficient to individually heat substantially all of the aluminum metal particles at a heating rate of at least about 100 K. per second to a temperature within a temperature range of from 1873 K. to about 2373 K., at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least about 75 percent by weight, based upon product weight, the aluminum nitride having a surface area within a range of from about 0.5 to about 6 square meters per gram and an oxygen content within a range of greater than 0 to less than about 1 percent by weight;
b) milling the product for a period of time sufficient to expose substantially all unreacted aluminum metal surfaces;
c) recycling a portion of the milled product for admixture with powdered aluminum metal;
d) heating the milled product, less the recycled portion, in the presence of gaseous nitrogen, to a temperature of from about 1173 K. to about 1873 K. for a period of time sufficient to convert substantially all of the exposed, unreacted aluminum metal surfaces to aluminum nitride.

25. The process of claim 24 wherein the aluminum nitride-containing product is quenched within a time of from about 0.1 second to about 4 minutes after said product exits the heated reaction zone, but before said product is milled.

26. The process of claim 25 wherein the time is from about 0.1 second to about 2 minutes.

* * * * *